UNITED STATES PATENT OFFICE.

WILLIAM C. CARNELL, OF PHILADELPHIA, PENNSYLVANIA.

INSECTICIDE.

997,601.  Specification of Letters Patent.  Patented July 11, 1911.

No Drawing.  Application filed April 7, 1908. Serial No. 425,719.

*To all whom it may concern:*

Be it known that I, WILLIAM C. CARNELL, a citizen of the United States, residing at Philadelphia, Pennsylvania, have invented certain new and useful Improvements in Insecticides; and I do hereby declare the following to be a full, clear, and exact description of the invention, such as will enable others skilled in the art to which it appertains to make and use the same.

My invention relates to insecticides and more especially to the production of a lime and sulfur wash capable of use as a dip or for destroying insects and fungi.

Heretofore the lime sulfur wash principally used to destroy the San Jose scale has been troublesome to make for the reason that the lime and sulfur have to be boiled for a long time and at the same time constantly stirred in order to produce a uniform product. This has been a very objectionable feature to the farmers and attempts have been made to produce a substitute that will avoid the boiling process. The period of boiling the wash now in use is not less than one hour.

I have succeeded in producing a compound containing lime and sulfur which is much less trouble to the user, being a finished product in a dry and finely divided state. This dry product when mixed with warm water or boiled with water for a period of not over five minutes, will produce a finished wash or dip having the general chemical properties and characteristics made by slaking quick lime and boiling the same with sulfur and water for a long period of time.

My process consists in taking air slaked lime, water slaked lime, partially burnt lime, so called shell lime or lime derived from any other source, whether partially recarbonated or not, and reducing the same to a fine state of subdivision so that it may be bolted or sieved in order to insure uniformity and fineness. In my experiments I have passed it through an 80 mesh sieve. This is mixed with sulfur, either the flowers of sulfur or commercial sulfur which is crushed or ground to pass through an 80 mesh sieve. Salt is sometimes used and if used at the start is ground to pass through a similar sieve. However, it sometimes happens that salt may be added at the end of the process, in which case, ordinary fine salt may be used. (By salt I mean ordinary sodium or potassium chlorids.) The proportions of the ingredients used are preferably those designated by the U. S. Department of Agriculture, Bureau of Chemistry, Bulletin 101; *i. e.* lime, thirty pounds or parts; sulfur twenty pounds or parts; and when salt is used, fifteen pounds or parts. These proportions are such as to have an excess of lime present by which is meant, there will be some lime that is not chemically combined with sulfur. The dry ingredients thoroughly mixed are then placed into a tightly closed vessel and heated to the reacting temperature of sulfur and lime preferably between 115° and 440° centigrade. This is preferably done by placing the closed vessel in a suitable oven or furnace. The effect of the heating is to form both partial and complete combinations between lime and sulfur which will form calcium sulfid, thiosulfates, polysulfids of calcium together with other compounds of calcium and sulfur, the exact chemical compositions of which are not known. The aim is to obtain a minimum of sulfate and sulfid. At the completion of the reaction the vessel is removed from the oven or furnace and the contents broken up and ground and preferably, but not necessarily, passed through a suitable sieve to obtain a uniform powder. The finished product is then in a dry, finely divided or powdered state ready for shipment and after the addition of warm water or boiled with water for a short period of time, not over five minutes, is ready for use as a spray, wash or dip.

In order to enable the product to be mixed with cold water I have in the product a quantity of quick-lime. When this is done the quantity of lime required to unite with a given quantity of sulfur is taken for a heat, and not the proportions above given. Theoretically this proportion is 1 of lime to 2.24 of sulfur, but as commercial lime is not pure, a somewhat larger amount of lime will be required. An excess of lime is desirable and necessary. After the reaction quick-lime is added to make up the quantity as per the proportions above given, more or less. The lime in slaking will generate sufficient heat to carry the soluble parts of the product into solution so that it may be mixed with cold water.

I claim:—

1. A method of producing an insecticide, which comprises forming various dry reaction products between sulfur and lime by heating an excess of dry, air slaked lime with sulfur in a tightly closed vessel to reacting temperature.

2. A method of producing an insecticide, which comprises forming various reaction products between sulfur and lime by mixing finely divided sulfur with an excess of finely divided lime in a dry condition and heating the mixture in a tightly closed vessel to reacting temperature.

3. A method of producing an insecticide, which comprises simultaneously forming a plurality of reaction products between sulfur and lime by heating substantially dry lime with substantially dry sulfur in a tightly closed vessel to reacting temperature.

4. An insecticide containing sulfids, sulfate and thiosulfate of calcium, the same being in a dry, powdery condition, which when treated with water contains as a main product polysulfids of calcium and thiosulfate of calcium.

5. An insecticide containing polysulfids and thiosulfate and an excess of lime, the same being in a dry powdery condition, which when treated with water contains as a main product polysulfids of calcium and thiosulfate of calcium.

In testimony that I claim the foregoing as my invention, I have signed my name in presence of two subscribing witnesses.

WM. C. CARNELL.

Witnesses:
D. PELLMAN BOYER,
LILLIAN B. BOYER.